May 21, 1935.  D. C. WEST ET AL  2,001,897
CIRCUIT INTERRUPTER
Filed Dec. 21, 1932    2 Sheets-Sheet 1
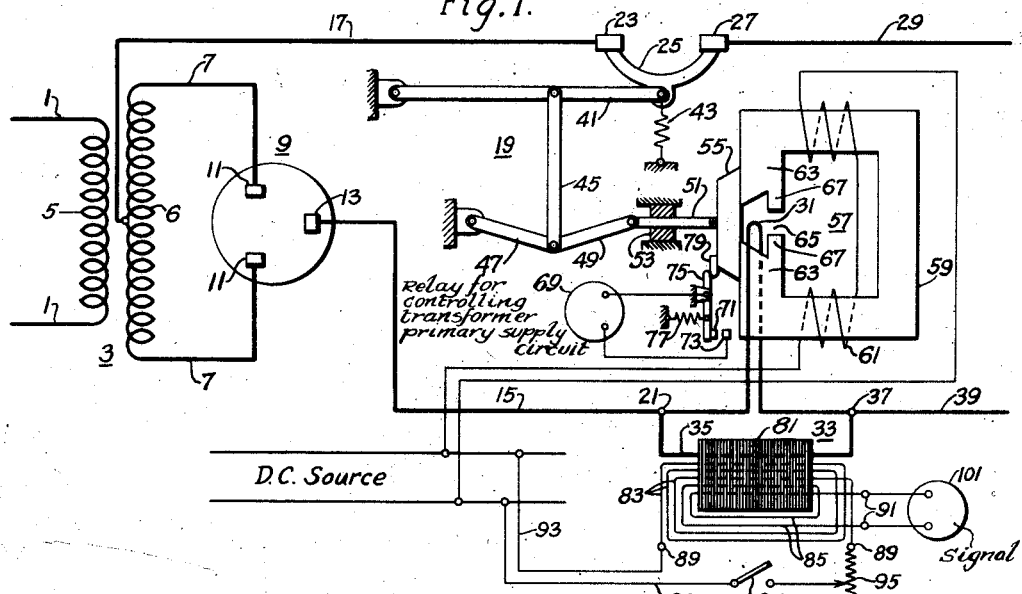
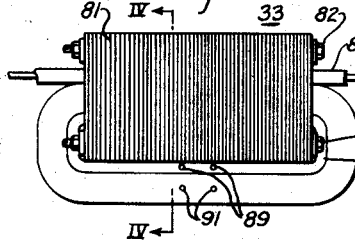
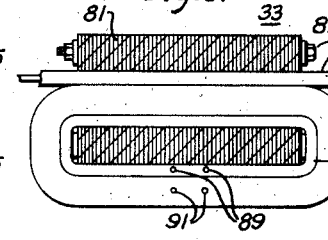
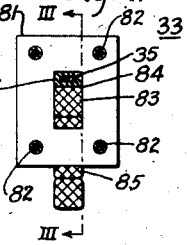
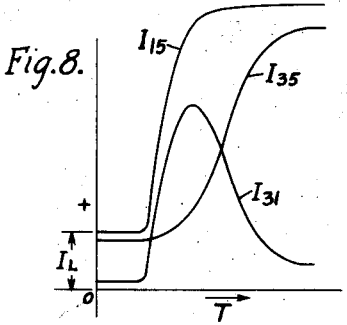
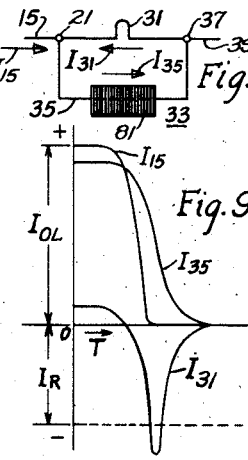
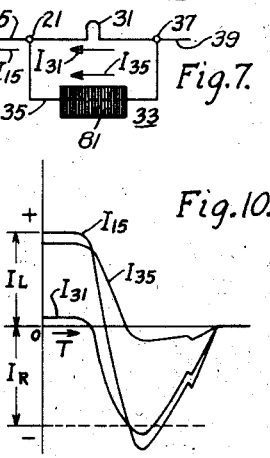
WITNESSES:
INVENTORS.
Donald C. West and
Herbert A. Rose.
BY
ATTORNEY

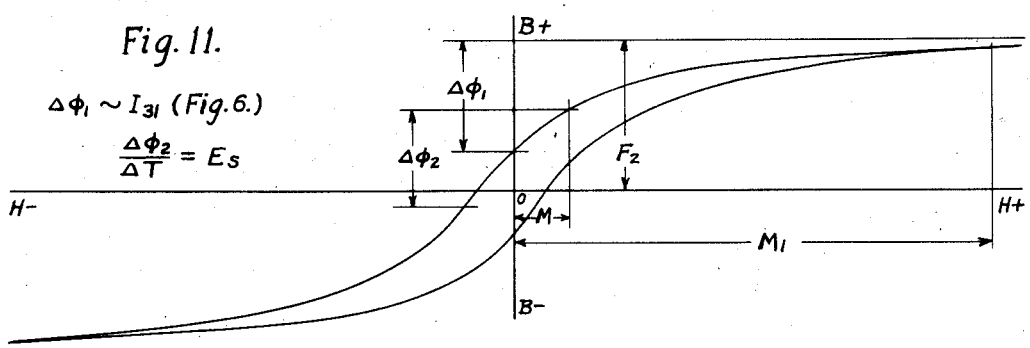

Fig. 11.

$\Delta \phi_1 \sim I_{31}$ (Fig. 6.)

$\dfrac{\Delta \phi_2}{\Delta T} = E_S$

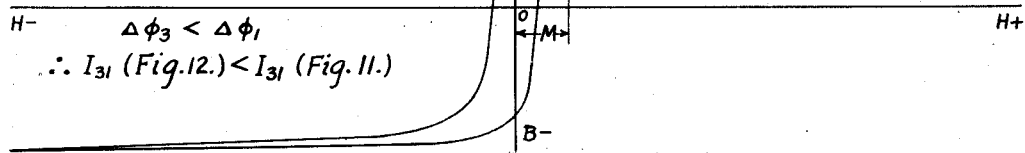

Fig. 12.

$\Delta \phi_3 \sim I_{31}$ (Fig. 6.)

$\dfrac{\Delta \phi_4}{\Delta T} = E_{S4}$ $\Delta \phi_3 < \Delta \phi_1$ $\therefore I_{31}$ (Fig. 12.) $< I_{31}$ (Fig. 11.)

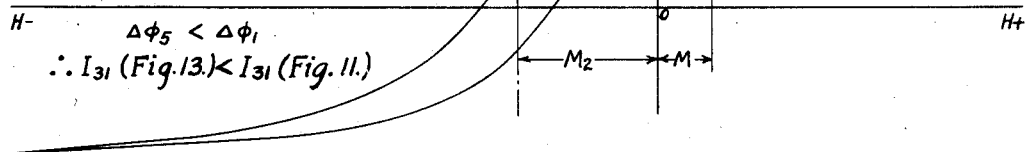

Fig. 13.

$\Delta \phi_5 \sim I_{31}$ (Fig. 6.)

$\dfrac{\Delta \phi_6}{\Delta T} = E_{S6}$ $\Delta \phi_5 < \Delta \phi_1$ $\therefore I_{31}$ (Fig. 13.) $< I_{31}$ (Fig. 11.)

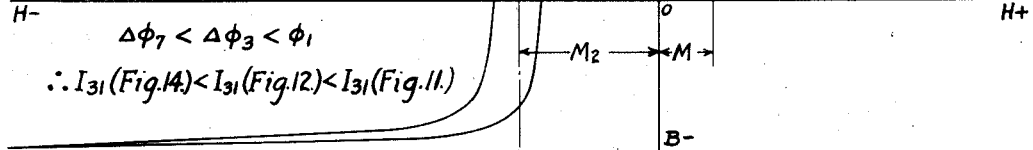

Fig. 14.

$\Delta \phi_7 \sim I_{31}$ (Fig. 6.)

$\dfrac{\Delta \phi_8}{\Delta T} = E_{S8}$ $\Delta \phi_7 < \Delta \phi_3 < \phi_1$ $\therefore I_{31}$ (Fig. 14.) $< I_{31}$ (Fig. 12.) $< I_{31}$ (Fig. 11.)

INVENTORS.
Donald C. West and
Herbert A. Rose.

Patented May 21, 1935

2,001,897

UNITED STATES PATENT OFFICE 2,001,897

CIRCUIT INTERRUPTER

Donald C. West and Herbert A. Rose, Forest Hills, Pa., assignors to Westinghouse Electric & Manufacturing Company, East Pittsburgh, Pa., a corporation of Pennsylvania Application December 21, 1932, Serial No. 648,193

14 Claims. (Cl. 175—294)

Our invention relates generally to electro-responsive devices, and more particularly, it relates to circuit breakers of the high-speed, direct-current type in which the contacts are held closed against a spring by an electro-magnet and are immediately released upon the occurrence of predetermined abnormal circuit conditions to give high speed interruption thereof.

Circuit breakers of this type are often used for protecting the individual units of a system of parallel rectifiers against backfire. In this application, if destructive damage to the back-firing unit is to be prevented, it is imperative that the breaker open as quickly as possible upon a reversal of the direction of power flow in the output leads of the affected unit (which condition accompanies a backfire).

It is also necessary that the dropping of a very heavy load in any part of the innerconnected system shall not cause any of the direct current breakers to open. This last requirement has not been satisfactorily met by the previously known types of high-speed circuit breakers, and it is an object of our invention, therefore, to provide an improved high-speed circuit breaker that shall be capable of accurately and positively distinguishing between a decrease in the load current and a reversal of the current.

It is another object of our invention to provide an improved inductive shunt that may be used with existing high-speed, direct-current breakers for imparting thereto a high degree of selectivity between decreases of load current and a reversal of the normal direction of current flow in the controlled electrical circuit; our improved inductive shunt to include a core of magnetic material in which the maximum energy change accompanying any decrease of load current is much less than the energy change accompanying a reversal of load current of sufficient magnitude to open the breaker.

A further object of our invention is to provide an inductive shunt for use with electrical apparatus that shall have a core of high retentivity magnetic material.

A further object of our invention is to provide the core of an inductive shunt for use in electrical circuits with a magnetizing winding or other means that shall supply a substantially constant energizing magneto-motive force thereto.

A still further object of our invention is to provide an electro-responsive device for use in electrical circuits that shall include an inductive shunt having a core member of magnetic material and a winding responsive to the flux changes in the core, the magnitude of the flux changes to depend not only on the magnitude of the power change in the connected circuit but also on the direction of power flow during the change.

Since, as previously pointed out, the principal field for immediate application of our invention is in connection with high-speed direct-current circuit breakers for use with mercury-arc rectifiers, we shall hereinafter describe an embodiment of our invention as applied thereto, without, however, in any way, intending to restrict the scope of our invention except as indicated in the appended claims.

The protection of mercury arc rectifiers, particularly when those rectifiers are used in regenerative systems comprising other rectifier units or rotating machinery, presents a number of difficulties which are not found in the protection of rotating machinery alone. These difficulties arise chiefly from the inherent phenomenon of backfire or arc back. When mercury arc rectifiers are used in non-regenerative circuits, the backfire, which consists of an anode-to-anode short circuit, may be satisfactorily taken care of by a circuit breaker positioned in the line circuit of the rectifier transformer. However, when a backfire occurs within a mercury arc rectifier, the direct-current side of which is connected to a source of power, the previous anode-to-anode short circuit now becomes, in addition, a cathode to anode short circuit of very low impedance. The resultant flow of power from the direct current circuit is, perforce, of tremendously high magnitude, and unless interrupted substantially within the first cycle will probably seriously damage the rectifier. In order to secure the required high speed opening of the direct current circuit immediately following the initiation of the backfire within the rectifier, it is customary to provide a high-speed, direct-current breaker of the conventional flux shifting type. The contacts of this type of breaker are biased to the open circuit position by a suitable spring and are held closed against the force of this spring by an electro-magnet having an air gap which is adapted to be bridged by an armature mechanically connected with the contacts. A flux shifting winding is positioned within this air gap and a pair of pole pieces are provided for giving a flux path in parallel with the movable armature. The flux shifting winding is energized upon a reversal of the normal direction of current flow to cause the flux traversing the armature to shift to the parallel path provided by the opposing pole pieces, thus practically instantaneously releasing the armature and permitting the biasing spring to open the contacts. In addition, it is customary to provide suitable relay means to electrically interlock the direct current breaker with the alternating current breaker positioned in the line side of the rectifier transformer so that the alternating current circuit will be opened as soon after the opening of the direct current breaker as is possible.

An inductive shunt is usually provided for paralleling the flux shifting winding in order to make the energization of that winding responsive to the rate of change of magnitude of the current flowing in the connected circuit.

This inductive shunt is particularly effective in securing the desired high speed opening of the direct current breaker upon the occurrence of a backfire because, due to the great rapidity with which the backfire current increases and the resultant high impedance of the inductive shunt as compared with the impedance of the flux shifting winding, most of the line current is caused to flow through the flux shifting winding. The use of this shunt is not without its disadvantages, however, because to be really effective it must possess considerable inductance—ordinarily secured by the use of an iron core—and, having considerable inductance, it is capable, under certain conditions, of storing up very appreciable amounts of energy which must be dissipated upon the removal of the energizing force. This energy storage becomes especially troublesome when the rectifier is subjected to overloads such as occur in railway applications. In this type of service, overloads resulting from motor flashovers, feeder short circuits, winding faults, and the like are of more or less frequent occurrence. These overloads, while large, are frequently removed practically instantaneously due to the operation of local circuit interrupters which may be capable of securing very rapid opening of the overloaded circuit. The overload current is, however, of sufficient duration to energize the core of an inductive shunt, and, upon the removal of the load, the inductive shunt discharges its stored energy as current through the flux shifting winding, the direction of current flow being the same as that accompanying a backfire. Frequently, this reversed current is of sufficient magnitude to open the breaker, which is a very objectionable result due to the accompanying possibility of overloading the remainder of the system and the necessity for restoring the disconnected rectifier to service. In fact, where only a few power supplying units are in use, the removal of any one from service may sufficiently overload the remaining units to cause a complete shut down of the entire system, thereby causing very objectionable discontinuities in service.

Our invention, however, provides for greatly decreasing the energy changes accompanying decreases in load, and at the same time, it does not interfere with normal breaker operation following a reversal of the direction of power flow. Thus we secure a circuit breaker which is much more selective in operation than the previously known devices, and which is particularly suitable for use in electrical circuits where continuity of service is one of the paramount requirements.

The features of our invention which we believe to be new are particularly pointed out in the appended claims. For full understanding of the principles of our invention and one mode of applying these principles, reference may be had to the accompanying drawings, in which:

Figure 1 is a diagrammatic view showing a high-speed direct-current circuit breaker embodying the principal elements of our invention;

Fig. 2 is an elevational view of the inductive shunt shown diagrammatically in Fig. 1;

Fig. 3 is a sectional view on the line III—III of Fig. 4.

Fig. 4 is a sectional view on the line IV—IV of Fig. 2.

Fig. 5 is a diagrammatic view showing the direction of current flow through the flux shifting winding and its associated inductive shunt during the occurrence of an overload condition.

Fig. 6 is a diagrammatic view similar to Fig. 5 showing the directions of current flow following the dropping of a heavy overload by the rectifier.

Fig. 7 is a diagrammatic view similar to Fig. 5 showing the direction of current flow during the occurrence of a backfire.

Figs. 8, 9, and 10 are graphs illustrating the variation in the magnitude of the current flowing in the rectifier output leads, the flux shifting winding, and the inductive shunt, with respect to time, for the circuit conditions of overload, dropping of overload, and backfire as illustrated diagrammatically in Figs. 5, 6, and 7.

Fig. 11 is a graph showing the central portion of the energization or hysteresis loop for the core of the inductive shunt shown in Figs. 1 to 4 when a magnetic material of low retentivity and high flux density at saturation is used therein.

Fig. 12 is a graph corresponding to Fig. 11 illustrating the loop resulting from the use of a magnetic material having a high retentivity for approximately the same flux density at saturation, and Figs. 13 and 14 are graphs corresponding, respectively, to Figs. 11 and 12 illustrating the effect of a constant energizing magneto-motive force applied to the core.

Referring to the drawings, the leads 1 connect the primary 5 of the rectifier transformer 3 to a suitable source of alternating current power. Leads 7 connect the tapped secondary 6 of the transformer 3 to the anodes 11 of the rectifier proper 9. Leads 15 and 17 connect the cathode 13 and the tapped secondary 6, respectively, with the terminal 21 and the contact member 23 of the high speed circuit breaker 19. A bridging contact 25 connects the contact members 23 and 27, and the electrical circuit is completed to a direct current bus by the lead 29. The circuit breaker terminal 21 connects with the flux shifting winding 31 and the conductor 35 of the inductive shunt 33. The flux winding 31 and the conductor 35 both terminate at the junction point 37. The lead 39 connects the junction point 37 with the positive current bus.

The circuit interrupter 19 comprises, in general, a contact assemblage biased to the open position, suitable linkages for actuating the contact assemblage, a movable armature, and a holding electro-magnet. Specifically, the bridging contact 25 which is pivoted on the link 41 is biased to the open position by a spring 43. A second link 45 operatively connects the link 41 with the armature actuated toggle links 47 and 49. A guide rod 51 which is adapted to slide in a suitable guide 53 is pivoted to the free end of the toggle link 49 and is rigidly affixed, at the other end, to the moving armature 55. The holding electromagnet 57 includes a core 59, of a magnetic material such as iron which is normally energized by a holding coil 61. A separate source of power for the holding coil may be used, as shown, or the direct current load bus itself may be employed.

The core member 59 terminates in two pole pieces 63 which are separated by the air gap 65. The air gap 65 is of reduced section at the inner and outer portions of the core proper, and there are two projections 67 extending from the pole pieces 63 into the gap 65. These projections 67 provide a flux path in parallel with the magnetic circuit that includes the pole pieces 63 and the armature 55, and thereby aid the shifting of the flux by the flux shifting winding 31. The flux shifting winding 31 is polarized to oppose the magneto-motive force of the holding coil 61 upon a reversal of the normal direction of current flow through the breaker.

An electrical interlock system is provided for energizing a control circuit which may be utilized to cause the opening of the alternating current breaker positioned in the line side of the rectifier transformer immediately following the opening of the direct current breaker. This interlock system includes a relay 69, a pair of contacts 71 and 73, and a pivotally mounted contact closing member 75 biased to the open position by a spring 77 and adapted to be actuated by the movement of the projection 79 which forms a part of the movable armature 55.

The inductive shunt 33 which is shown particularly in Figs. 2, 3 and 4 includes a rectangular, laminated core 81 of magnetic material having a centrally disposed opening 84 therein. The conducting member 35 and two coils 83 and 85 are disposed in this opening 84. The conductor 35 is insulated from the core 81 and the coil 83 by means of an insulating tube 87. The coils 83 and 85 are likewise insulated from the core 81 by suitable means (not shown), and are provided with terminals 89 and 91, respectively. We prefer to form the core 81 from a plurality of hollow-square laminations (Fig. 4) held together by suitable means such as the insulated bolts 82.

The coil 83 is used, as will be described in some detail later, for providing a substantially constant magneto-motive force to the core 81 of the inductive shunt 33. The coil 85 is used for the actuation of a relay or other similar means. Referring to Fig. 1, the lead 93 connects one of the terminals 89 of the coil 83 with the direct current source, the other terminal 89 being connected to the direct current source through a variable resistance 95, a switch 97, and the lead 99. The relay 101 is connected directly to the terminals 91 of the coil 85, and provides a ready means for selectively controlling an electric circuit, which may be used to operate an indicating or other means, in accordance with the direction of the power flow in the circuit connected to the winding 31 and the shunt 33.

The operation of our invention may best be discussed in conjunction with Fig. 1, Figs. 5 to 7, and the various graphs. The flux shifting coil 31, as mentioned before, is polarized to open the breaker only upon the occurrence of a reversal in the normal direction of current flow such as is shown graphically in Fig. 10, the ordinate $I_L$ representing normal line current. The time required for a complete reversal in the load current from full load magnitude in one direction to full load magnitude in the other direction is of the order of one-half cycle. The mechanical operation of the breaker 19 during the opening of the circuit is as follows: The shifting of the flux holding the armature 55 against the core 59 reduces the holding force to a negligible value. The armature 55 immediately moves, under the transmitted force of the spring 43, to permit the toggle links 47 and 49 to collapse downwardly, thus permitting the free movement of the bridging member 25 to the open position by the spring 43.

Our invention is more particularly concerned with the electrical effects of various load conditions on the flux shifting winding 31 and its associated shunt 33, and the remainder of the discussion of the operation of the breaker will, therefore, be concerned chiefly with a consideration of those effects. Upon the occurrence of an overload such as is illustrated graphically in Fig. 8 where the ordinate $I_L$ represents the normal load current, the line current $I_{15}$ divides between the conductor 35 and the flux shifting winding 31 in a proportion which depends upon the steepness of the wave front of the overload. $I_{35}$ represents the current in the conductor 35 and, similarly, $I_{31}$ represents the current in the flux shifting winding 31. After the overload has existed for a short time, however, a condition of comparative equilibrium is reacted and the choking action of the shunt becomes negligible. The current then divides inversely as the ohmic resistances of the flux shifting winding 31 and the conductor 35. These resistances are usually proportional so that the core is not saturated when normal current flows through the breaker.

If the core 81 of the inductive shunt 33 is made from one of the ordinary grades of low retentivity steel having a high flux density at saturation and the coil 83 is not energized, the energization of hysteresis loop will be substantially the same as that shown in Fig. 11. The abscissa M represents the energizing magneto-motive force resulting from the flow of normal current through the current carrying conductor 35, a circuit-condition of substantial equilibrium being assumed. Similarly, the abscissa $M_1$ represents the energizing magneto-motive force set up by the current carrying conductor 35 as a result of a sustained abnormal load condition. When the division of the overload current has reached the condition of comparative equilibrium, considerable magnetic energy has been stored in the inductance represented by the core 81 and the current carrying conductor 35. The flux density at this time is represented by the ordinant $F_2$ of Fig. 11. If this overload should suddenly be dropped, as for example, due to the opening of a load circuit, the current in the conductor 15 may drop to zero within a very short interval of time, see Fig. 9 where the ordinant $I_{OL}$ represents the overload current. The magnetic energy which is stored in the shunt 33 cannot be released instantaneously, however, and the greater portion is dissipated as current flow through the resistance of the flux shifting winding 31. This current $I_{31}$ flowing through the flux shifting winding 31 will be in the opposite direction to the normal load current (represented as $I_{15}$ in Figs. 6 and 9). The magnitude of this current depends on the flux change $\Delta\phi_1$ (Fig. 11), and the length of time required to make the change (i e. the rapidity with which the load is dropped), the flux change $\Delta\phi_1$, being, therefore, a measure of the stored energy. The flux change for a complete reversal of the current from full load value in the normal direction to the value in the reverse direction where the breaker opens is represented by $\Delta\phi_2$ in Fig. 11.

The flux change $\Delta\phi_2$ accompanies a transient condition—a backfire—and is a measure of the back electromotive force opposing current flow through the shunt conductor 35. The resistance of the flux shifting winding 31 and the shunt conductor 35 are usually so proportioned that for equilibrium circuit conditions about 90 percent of the total line current flows through the shunt. The inductances are proportioned so that substantially the reverse is true for a transient condition such as a backfire, the chief function of the shunt being to cause the greater part of the backfire current to flow through the flux shifting winding.

In order to secure the positive opening of the breaker upon the occurrence of a backfire, it is necessary that the reverse current in the flux shifting winding be of greater magnitude than the current represented by the ordinate $I_R$ in Figs. 9 and 10. If a current of this magnitude is obtained upon backfire, when using a core made from an ordinary grade of steel having a hysteresis loop such as is shown in Fig. 11, the back electromotive force $$(E = \frac{\Delta \phi_1}{\Delta T}$$

wherein $\Delta \phi_1$ represents the flux change in a period of time $\Delta T$) will be of comparable magnitude with the self-induced electromotive force of the shunt $$(E_S = \frac{\Delta \phi_2}{\Delta T_1}$$

wherein $\Delta \phi_2$ represents the flux change in a period of time $\Delta T_1$), following the dropping of a load. This highly undesirable condition results from the fact that $\Delta \phi_1$ and $\Delta T$ are, respectively, substantially equal to $\Delta \phi_2$ and $\Delta T_1$, in the usual circuit, and it causes the current in the flux shifting winding $I_{31}$ (Fig. 9) following the rapid dropping of a heavy load to be of substantially the same magnitude, and in the same direction, as the reverse current which opens the breaker following a reversal of load. Thus if the breaker is to remain closed following the removal of a heavy load and yet open immediately upon a reversal in the direction of load, it is necessary that the various mechanical parts and the magnetic circuits be specially designed and very accurately adjusted for each particular application in order to distinguish between the two conditions, and, in some cases, this is practically impossible. Furthermore, it is difficult to preserve this adjustment, and as a result most of the known breakers of this type are incapable of accurately distinguishing between a drop in load and a reversal in load.

The curves shown in Figs. 8, 9, and 10 are of particular value in graphically illustrating the difficulties encountered in securing the desired selective operation of the breaker. Fig. 8 shows the effect of the choking action of the shunt during an overload condition. The shunt circuit $I_{35}$ lags behind the load current $I_{15}$ both in magnitude and in time, while the current in the flux shifting winding $I_{31}$ increases beyond its normal non-transient or E/R value.

Fig. 9, which is drawn to the same scale as Fig. 8, shows the effect of the rapid dropping of an overload $I_{15}$ of magnitude $I_{OL}$. The first result noted is a decrease in the magnitude of the current $I_{31}$ flowing through the flux shifting winding 31. Then, due to the stored energy in the core of the shunt 33 which tends to cause a persistence of the shunt current $I_{35}$, the current $I_{31}$ in the flux shifting winding reverses in direction. The peak value of this reverse current depends, in part, on the rapidity with which the load is dropped, but for usual system conditions, it is sufficiently large to exceed the critical value $I_R$ and to open the breaker following the occurrence of nearly every such abnormal condition.

Fig. 10 is drawn to a somewhat larger scale than Figs. 8 and 9, and it shows the current distribution during the occurrence of backfire. It will be noted that due to the great rapidity with which the direction of current is reversed, the actual reverse current in the shunt $I_{35}$ is very small, and that the current in the flux shifting winding $I_{31}$ is very large. This, of course, is the desired result because only the current $I_{31}$ is effective to open the breaker.

If the core 81 is made of high retentivity material such as the nickel iron alloy disclosed in U. S. Patent 1,807,021, or very pure iron, the maximum flux change accompanying the removal of an overload is reduced below the value which will cause the energy dissipating current to reach a magnitude sufficient to open the breaker. The reduction in the energy dissipating current in no way disturbs the normal function of the shunt which is the securing of large currents in the flux shifting winding during backfire. We have found that a maximum flux change following the dropping of an overload which is not greater than approximately one-fifth the possible cyclic change gives satisfactory selective operation for most present day apparatus. It is desirable, however, that the flux change accompanying the dropping of load be minimized as much as possible. This is illustrated graphically in Fig. 12 which shows the hysteresis loop for a high retentivity material having a flux density at saturation substantially the same as the steel for which the curve in Fig. 11 was drawn. The ordinates $\Delta \phi_3$ and $\Delta \phi_4$ correspond to $\Delta \phi_1$ and $\Delta \phi_2$ of Fig. 11.

We have further found that if the residual flux density of the iron in the core 81 be at least equal to (though preferably greater than) two-thirds the flux density at saturation, satisfactory selective operation of circuit breakers embodying our improved inductive shunt will be secured under practically all known circuit and permissible overload conditions. This requirement may be satisfied, as previously discussed, by the use of special high retentivity material in the core 81, or it may be satisfied by supplying a suitable energizing current to the coil 83. Usually a substantially constant energizing force of magnitude comparable to the abscissa $M_2$ in Figs. 13 and 14 is sufficient to secure the desired selectivity. For special applications, however, the energization may be controlled through the variable rheostat 95, or the coil may be entirely disconnected by the switch 97.

By the addition of this energized force $M_2$, the flux change accompanying a removal of an overload is reduced from the value represented by the ordinate $\Delta \phi_1$ in Fig. 11 to the value represented by the ordinate $\Delta \phi_5$ in Fig. 13. The energy dissipating current is likewise reduced. The flux change accompanying a reversal of current, is altered very little, however, $\Delta \phi_6$ being substantially equal to $\Delta \phi_2$. This assures a proper division of the backfire current between the flux shifting winding 31 and the shunt conductor 35. Thus, it may be seen that by the addition of the coil 83 to the usual design of inductive shunt we have provided a convenient, effective means for making the circuit breaker highly selective between a removal of load and a reversal of load.

If very high selectivity is required, it is, of course, possible to combine the features of high retentivity material and an additional energizing coil for the core. This combination gives a hysteresis loop comparable to that illustrated in Fig. 14, and it will be seen from an examination of this graph that the energy change within the core during the removal of a heavy overload—represented by the ordinate $\Delta\phi_7$—may be reduced to a very small quantity.

To summarize, it will be seen that we have disclosed a new and improved high-speed direct-current circuit breaker which is particularly suitable for use in a system of interconnected mercury arc rectifiers, due to its inherent ability to accurately distinguish between decreases in load and reversals in the direction of load. Furthermore, we have disclosed an improved method for rendering electrical apparatus responsive to predetermined electrical conditions in the connected circuit, and, in addition, we have shown a convenient method of embodying the features of our invention into existing apparatus with but very slight structural changes.

While, in accordance with the patent statutes, we have disclosed but one embodiment of our invention, the principles are applicable to other structures, for example, to secure very selective high speed opening on overload, and we desire, therefore, that the language of the accompanying claims shall be accorded the broadest reasonable construction and that our invention be limited only by what is explicitly stated in the claims and by the prior art.

We claim as our invention:

1. In an electro-responsive device, a winding and an inductive shunt associated therewith, said shunt including a conducting means and a core member of a magnetic material which possesses the characteristic that the unit flux density when it is substantially saturated is not more than one and one-half times the unit flux density following the removal of the saturating magneto-motive force.

2. In electrical apparatus, an electro-responsive means including a core member having an energizing winding and a normally ineffective deenergizing winding for supplying a magneto-motive force opposing that of said energizing winding, said deenergizing winding being effective upon the occurrence of predetermined electrical conditions, said deenergizing winding being paralleled by an inductive shunt having a core of magnetic material and means for substantially saturating said core when normal current is flowing through said deenergizing winding, the flux density in said core when the current flowing through said deenergizing winding has dropped to zero, being at least equal to two-thirds the flux density at saturation.

3. In a circuit interrupter, means tending to open said interrupter, electro-magnetic means for holding said interrupter closed, and other electromagnetic means including an inductive shunt for causing said holding means to become ineffective, said inductive shunt having a core member of high retentivity magnetic material.

4. In combination in an electric circuit, a source of direct current power, a winding energized in response to the electrical conditions in said circuit, and an inductive shunt associated with said winding, said shunt having conducting means for shunting said winding, a core member of magnetic material, and means for causing the energy changes in said core member during current variations for one direction of power flow to be small as compared with the energy changes for corresponding current variations during power flow in the opposite direction.

5. In combination in an electric circuit, a source of direct current power, a winding energized in response to the electrical conditions in said circuit, and an inductive shunt associated with said winding, said shunt including conducting means for paralleling said winding, a core member of magnetic material, and means for causing the maximum flux change in said core member during load variations to be not substantially greater than one-fifth the maximum possible cyclic change for said core.

6. In a circuit interrupter relatively movable contact members for opening and closing the circuit, means biasing said contract members to the open position, electro-magnetic means for holding said contract members closed against said biasing means, a flux-shifting winding connected to the circuit controlled by said circuit interrupter for causing said electro-magnetic holding means to become ineffective, and an inductive shunt associated with said flux shifting winding, said shunt including a winding, normally connected in shunt with said flux shifting winding, and a core member of a magnetic material which has sufficient retentivity to cause the residual flux density following the removal of an energizing force capable of substantially completely saturating said material to be at least equal to two-thirds of the flux density at saturation.

7. In combination in an electric circuit, a source of direct current power and a circuit interrupter, said interrupter including a pair of relatively movable contact members, means biasing at least one of said members to the open position, electromagnetic means for holding said contact members closed, a winding connected in current responsive relationship with said circuit for rendering said holding means ineffective upon a reversal of the direction of current flow through said interrupter, and an inductive shunt, connected in circuit with said winding for causing the current flowing therethrough to become responsive to the rate of change in magnitude of the current flowing in said circuit, said inductive shunt including means for causing the maximum energy change therein during the dropping of a load to be small as compared with the energy change resulting from a reversal in the direction of current flow of sufficient magnitude to open said interrupter.

8. In combination in an electric circuit, a source of direct current power, and a circuit interrupter, said interrupter including a pair of relatively movable contact members for opening and closing the circuit, means biasing said relatively movable members to the open position, a core member of magnetic material having a normally energized winding for holding said contact members closed against said biasing means, a flux shifting winding, connected in current responsive relationship with the circuit controlled by said interrupter, for rendering said core ineffective to hold said contact members closed upon a reversal of the direction of current flow through said interrupter, and an inductive shunt, connected in circuit with said flux shifting winding for causing the current flowing therethrough to become responsive to the rate of change in magnitude of the current flowing in said interrupter, said inductive-shunt including means for causing the maximum energy change therein during the dropping of a load to be small as compared with the energy change resulting from a reversal in the direction of current flow of sufficient magnitude to open said interrupter.

9. In a circuit interrupter, relatively movable contact members for opening and closing the circuit, means biasing said relatively movable members to the open position, a core member of magnetic material having a normally energized winding for holding said contact members closed against said biasing means, a flux shifting winding connected to the circuit controlled by said interrupter for releasing said separable contact means in response to predetermined current conditions in said circuit, and an inductive shunt connected in circuit with said flux shifting winding for causing the current flow therethrough to be responsive to the rate of change in magnitude of the current flowing in the circuit controlled by said interrupter, said inductive shunt including a core member of high retentivity magnetic material for reducing the magnitude of the flux changes set up therein by fluctuations of the load in the controlled circuit.

10. In a circuit interrupter, relatively movable contact members for opening and closing the circuit, means biasing said relatively movable members to the open position, a core member of magnetic material having a normally energized winding for holding said contact members closed against said biasing means, a flux shifting winding connected to the circuit controlled by said circuit interrupter for releasing said separable contact means in response to predetermined current conditions in said circuit, and an inductive shunt connected in circuit with said flux shifting winding for causing the current flow therethrough to be responsive to the rate of change in magnitude of the current flowing in the circuit controlled by said interrupter, said inductive shunt including a core member of magnetic material and a normally energized winding for providing a substantially constant energizing magneto-motive force therefor, said constant energization substantially saturating said core and thereby reducing the magnitude of the flux changes set up therein by fluctuations of load in the controlled circuit.

11. In a circuit interrupter, relatively movable contact means for opening and closing the circuit, means biasing said relatively movable contact means to the open position, an armature connected to said contact means, and a core member of magnetic material for attracting said armature and holding said separable contact means closed against said biasing means, said core member having a normally energized winding for energizing said core member to hold said armature, pole pieces providing parallel magnetic flux paths one of which is completed by said armature, and a conductor positioned between said parallel flux paths for shifting the flux from said armature to the other flux path upon the occurrence of a predetermined current condition, said flux shifting winding being connected in circuit with an inductive shunt having a core member of high retentivity material.

12. In combination, a conducting means, a conducting shunt therefor, a core of magnetic material surrounding at least a part of said shunt, a winding on said core, energizing means for said winding, another winding on said core, and electro-responsive means operatively connected to said other winding.

13. In combination, a conducting means, a conducting shunt therefor, and a core of magnetic material surrounding at least a part of said shunt, the magnetic material in said core having a high inherent retentivity.

14. In electrical apparatus, a conducting means, a conducting shunt therefor, a core of magnetic material surrounding at least a part of said conducting shunt, and means, including a winding positioned upon said core and energizing means for said winding, for causing said core to be substantially saturated during the normal operation of said apparatus.

DONALD C. WEST.
HERBERT A. ROSE.